US009352719B2

(12) United States Patent  
Nakamura et al.

(10) Patent No.: US 9,352,719 B2  
(45) Date of Patent: May 31, 2016

(54) SILICONE RUBBER SHEET AND AIRBAG DEVICE

(71) Applicants: Takata Corporation, Tokyo (JP); SHIN-ETSU CHEMICAL CO., LTD, Tokyo (JP)

(72) Inventors: Kenji Nakamura, Tokyo (JP); Shuichiro Miyata, Tokyo (JP); Masakatsu Hotta, Tokyo (JP); Tsutomu Yoneyama, Tokyo (JP); Masaki Fukuda, Tokyo (JP)

(73) Assignees: TAKATA CORPORATION, Tokyo (JP); SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/400,485

(22) PCT Filed: Apr. 29, 2013

(86) PCT No.: PCT/JP2013/062515  
§ 371 (c)(1),  
(2) Date: Nov. 11, 2014

(87) PCT Pub. No.: WO2013/172188  
PCT Pub. Date: Nov. 12, 2013

(65) Prior Publication Data  
US 2015/0123387 A1 May 7, 2015

(30) Foreign Application Priority Data

May 18, 2012 (JP) ................................. 2012-114948

(51) Int. Cl.
*B60R 21/235* (2006.01)
*D06M 15/693* (2006.01)
(Continued)

(52) U.S. Cl.
CPC ............. *B60R 21/235* (2013.01); *B60R 21/231* (2013.01); *D06M 15/643* (2013.01);
(Continued)

(58) Field of Classification Search
CPC ...................................................... B60R 21/262
See application file for complete search history.

(56) References Cited

U.S. PATENT DOCUMENTS 5,573,270 A * 11/1996 Sogi ...................... B60R 21/233  
                                                               280/740  
6,945,557 B2 * 9/2005 Takimoto .............. B60R 21/206  
                                                               280/730.1

(Continued)

FOREIGN PATENT DOCUMENTS

| JP | 2002-337646 A | 11/2002 |
| JP | 2003-128919 A | 5/2003 |

(Continued)

OTHER PUBLICATIONS

International Search Report dated Aug. 6, 2013 issued in connection with International Application No. PCT/JP2013/062515.

*Primary Examiner* — Nicole Verley  
(74) *Attorney, Agent, or Firm* — Foley & Lardner LLP (57) ABSTRACT

An airbag device including an inflator, an airbag and a silicone rubber sheet. The silicone rubber sheet is used for a flow passage to feed gas from an inflator to an airbag and is produced by stacking 0.5 mm or more of silicone composition comprising: 100 parts by weight of organopolysiloxane which is represented by the following average composition formula $R^1SiO_{(4-n)/2}$, where in the formula, $R^1$ represents a substituted or unsubstituted monovalent hydrocarbon group and n represents a positive number of 1.95 to 2.05, and which exhibits an average degree of polymerization of 1,000 or more; 20 to 80 parts by weight of reinforcing silica powder having a specific surface area of 50 m²/g or more; and a curing agent on at least an inner surface of a fiber fabric constituting the flow passage and performing heat curing.

4 Claims, 7 Drawing Sheets

(51) Int. Cl.
*B60R 21/231* (2011.01)
*D06M 15/643* (2006.01)
*B60R 21/262* (2011.01)

(52) U.S. Cl.
CPC ............ *D06M15/693* (2013.01); *B60R 21/262* (2013.01); *B60R 2021/23123* (2013.01); *B60R 2021/23504* (2013.01); *B60R 2021/23576* (2013.01)

(56) References Cited

U.S. PATENT DOCUMENTS

| | | | | |
|---|---|---|---|---|
| 7,683,148 | B2* | 3/2010 | Angeletakis | A61K 6/10 |
| | | | | 526/128 |
| 7,740,273 | B2* | 6/2010 | Breed | B60R 21/0132 |
| | | | | 280/736 |
| 7,832,761 | B2* | 11/2010 | Shimazaki | B60R 21/201 |
| | | | | 280/728.1 |
| 8,029,016 | B2* | 10/2011 | Moritani | B60R 21/233 |
| | | | | 280/730.1 |
| 8,366,144 | B2* | 2/2013 | Fink | B60R 21/213 |
| | | | | 280/730.2 |
| 8,727,376 | B2* | 5/2014 | Goto | B60R 21/262 |
| | | | | 280/730.2 |
| 8,785,586 | B2* | 7/2014 | Mizushima | C08K 5/5399 |
| | | | | 528/17 |
| 8,905,429 | B1* | 12/2014 | Pitonyak | B60R 21/231 |
| | | | | 280/728.1 |
| 2010/0181749 | A1* | 7/2010 | Sugimoto | B60R 21/2171 |
| | | | | 280/743.2 |
| 2011/0189440 | A1* | 8/2011 | Appleby | B22C 9/04 |
| | | | | 428/156 |
| 2012/0043745 | A1* | 2/2012 | Bae | B60R 21/235 |
| | | | | 280/742 |
| 2015/0014973 | A1* | 1/2015 | Osterfeld | B60R 21/262 |
| | | | | 280/742 |

FOREIGN PATENT DOCUMENTS

| | | |
|---|---|---|
| JP | 2006-001549 A | 1/2006 |
| JP | 2009-184479 A | 8/2009 |
| JP | 2009-543731 A | 12/2009 |
| JP | 2001-131644 A | 7/2011 |
| JP | 2011-521837 A | 7/2011 |
| WO | WO-2008/011414 A2 | 1/2008 |
| WO | WO-2009/146220 A1 | 12/2009 |

* cited by examiner

SILICONE RUBBER SHEET AND AIRBAG DEVICE

CROSS REFERENCE TO RELATED APPLICATIONS

The present application is a U.S. National Stage of International Application No. PCT/JP2013/062515 filed on Apr. 29, 2013 which claims the benefit of Japanese Patent Application No. 2012-114948 filed on May 18, 2012. The entire disclosures of which are incorporated herein by reference.

TECHNICAL FIELD

The present invention relates to a silicone rubber sheet and an airbag device. In particular, the present invention relates to a silicone rubber sheet suitable for use as a flow passage component of high-temperature high-pressure gas spouted from an inflator of an airbag device mounted on a vehicle or the like and an airbag device including the silicone rubber sheet.

BACKGROUND ART

In general, airbag devices are mounted on vehicles such as automobiles, where airbags are expanded and developed in cars in the event of an emergency, e.g., crash and rapid deceleration, so as to absorb shocks applied to occupants. Various types of airbag devices have been developed and adopted. Examples airbag devices include a driver airbag device incorporated in a steering, a passenger airbag device incorporated in an instrument panel, a side airbag device incorporated in a vehicle side portion or a seat, a curtain airbag device incorporated in an upper portion of a door, and a knee airbag device corresponding to knee portions of an occupant.

In general, the airbag device includes an airbag which is usually folded and which is expanded and developed in the event of an emergency, and an inflator to feed gas to the airbag. The inflator is connected to, for example, an ECU (electronic control unit) of a vehicle and is controlled on the basis of a measurement value of an acceleration sensor or the like. When the ECU detects or predicts crash or rapid deceleration of the vehicle, the inflator is ignited because of an ignition current from the ECU, an agent stored in the inside of the inflator is burnt to generate gas, and the gas is fed to the airbag.

In general, the gas spouted from the inflator is a high-temperature high-pressure gas and the vicinity of the spouting nozzle of the inflator has a heat-resistant pressure-resistant structure (for example, refer to PTL 1 to PTL 4). In particular, it is necessary that the curtain airbag (head side airbag) be expanded and developed in a wide range from a front seat to a rear seat and, in many cases, a large high-power inflator is employed to feed gas into the airbag.

PTL 1 describes a gas feed pipe having a bifurcated end. Also, PTL 2 describes a diffuser pipe provided with gas distribution holes. Also, PTL 3 describes a gas introduction pipe having a protruded portion at part of a circumferential side surface of a tubular body. Also, PTL 4 describes a cloth gas guide, thereby negating the need for a rigid gas guide.

CITATION LIST

Patent Literature

PTL 1: Japanese Unexamined Patent Application Publication No. 2006-1549

PTL 2: Japanese Patent No. 3724383

PTL 3: Japanese Unexamined Patent Application Publication No. 2009-184479

PTL 4: Japanese Unexamined Patent Application Publication No. 2011-521837

SUMMARY OF INVENTION

Technical Problem

The flow passage components (gas feed pipe, diffuser pipe, and gas introduction pipe) described in PTL 1 to PTL 3 are made from metals and there are problems that increase in size and weight occur easily and complicated metal forming processing is necessary. Meanwhile, as for the flow passage component (cloth gas guide) described in PTL 4, cloth member needs to be wrapped around itself several times in order to deal with a strong inflator and there is a problem in increasing size. Furthermore, in recent years, a space for arranging airbag devices tends to become narrow and there is a need for reducing size and weight of the flow passage components.

The present invention has been made in consideration of the above-described problems and it is an object to provide a silicone rubber sheet and an airbag device, where size and weight of a flow passage component to feed high-temperature high-pressure gas spouted from an inflator to an airbag are reduced.

Solution to Problem

The present invention provides a silicone rubber sheet to be used for a flow passage to feed a gas from an inflator, which generates gas by burning an agent stored in the inside, to an airbag, which is usually folded and is expanded and developed in the event of an emergency, wherein the silicone rubber sheet is produced by stacking 0.5 mm or more of silicone composition containing (A) 100 parts by weight of organopolysiloxane which is represented by the following average composition formula (1): $R^1SiO_{(4-n)/2}$ (1), where in the formula, $R^1$ represents a substituted or unsubstituted monovalent hydrocarbon group and n represents a positive number of 1.95 to 2.05, and which exhibits an average degree of polymerization of 1,000 or more, (B) 20 to 80 parts by weight of reinforcing silica powder having a specific surface area of 50 m²/g or more, and (C) a curing agent on at least an inner surface of a synthetic fiber fabric or an inorganic fiber fabric constituting the flow passage and heat cure is performed thereon.

Meanwhile, an airbag device according to the present invention includes an airbag which is usually folded and is expanded and developed in the event of an emergency, an inflator which generates gas by burning an agent stored in the inside, and a flow passage to feed the gas from the inflator to the airbag, wherein a silicone rubber sheet produced by stacking 0.5 mm or more of silicone composition containing (A) 100 parts by weight of organopolysiloxane which is represented by the following average composition formula (1): $R^1SiO_{(4-n)/2}$ (1), where in the formula, $R^1$ represents a substituted or unsubstituted monovalent hydrocarbon group and n represents a positive number of 1.95 to 2.05, and which exhibits an average degree of polymerization of 1,000 or more, (B) 20 to 80 parts by weight of reinforcing silica powder having a specific surface area of 50 m²/g or more, and (C) a curing agent on at least an inner surface of a synthetic fiber fabric or an inorganic fiber fabric constituting the flow passage and heat cure is performed, is used for at least part of the flow passage.

For the above-described silicone rubber sheet and airbag device, the silicone rubber sheet may be configured to have a cylindrical shape in such a way as to cover the spouting nozzle of the inflator and be fixed to the airbag or the inflator. Also, the silicone rubber sheet may be disposed between the airbag and the inflator in such a way as to constitute at least part of the flow passage.

The above-described airbag device may include an inner tube in which the silicone rubber sheet or a shaped sheet produced by sewing up of the silicone rubber sheet is formed into a substantially cylindrical shape, and a shape retention member to retain the shape of the inner tube. In addition, the shape retention member may be a belt member which connects an end portion extended from the inner tube to the outer periphery of the inner tube, a cover member connected to an end portion extended from the inner tube in such a way as to cover the outer periphery of the inner tube, or a circular member which is inserted through an overlap portion of the inner tube and is connected to the outer periphery of the inner tube.

Also, the cylindrical portion may be formed from one end side of the silicone rubber sheet or the shaped sheet produced by sewing up of the silicone rubber sheet, the folded portion may be formed from the other end side so as to cover the cylindrical portion, and the other end and the folded portion may be sewed up. Also, when the silicone rubber sheet or the shaped sheet produced by sewing up of the silicone rubber sheet is formed into a substantially cylindrical shape, tab portions protruding in the forward and backward directions of the flow passage may be included, and the tab portions may be sewed on the airbag.

Advantageous Effects of Invention

According to the silicone rubber sheet and the airbag device of the present invention described above, gas can be sufficiently fed into the airbag by covering the outer circumference of the spouting nozzle of the inflator with the silicone rubber sheet having certain strength and thickness in combination when the inflator is inserted into the airbag. Therefore, a flow passage component (gas introduction pipe and the like) which has been produced by complicated forming of a metal pipe in the related art is not necessary anymore, so that miniaturization and weight reduction can be facilitated around the inflator. This will contribute to the cost reduction. Meanwhile, the silicone rubber sheet is stacked on the fiber fabric and, therefore, expansion and deformation of the silicone rubber sheet when the gas is fed from the inflator can be suppressed.

Also, a flow passage component in which a high-temperature and high-pressure gas do not come into direct contact with the airbag can be formed by forming the silicone rubber sheet into a cylindrical shape in such a way as to cover the spouting nozzle of the inflator.

Also, for example, a base cloth of the airbag disposed around the outer periphery of the inflator can be protected from a high-temperature and high pressure gas by disposing the silicone rubber sheet between the airbag and the inflator.

Also, deformation of the inner tube when the gas is fed from the inflator can be suppressed by forming the inner tube from the silicone rubber sheet or a shaped sheet produced by sewing up of the silicone rubber sheet and connecting the shape retention member to the inner tube. Furthermore, expansion and deformation of the inner tube can be suppressed easily by forming the shape retention member from a belt member, a cover member, or a circular member.

Also, the cylindrical portion is formed from one end side of the silicone rubber sheet or the shaped sheet produced by sewing up of the silicone rubber sheet, the folded portion is formed from the other end side so as to cover the cylindrical portion and, thereby, an inner tube having excellent shape retainability can be formed from one silicone rubber sheet or shaped sheet.

Also, tab portions are formed on the silicone rubber sheet or the shaped sheet produced by sewing up of the silicone rubber sheet, the tab portions are sewed on the airbag and, thereby, an inner tube having excellent shape retainability can be formed from one silicone rubber sheet or shaped sheet.

DESCRIPTION OF EMBODIMENTS

Figure 1:
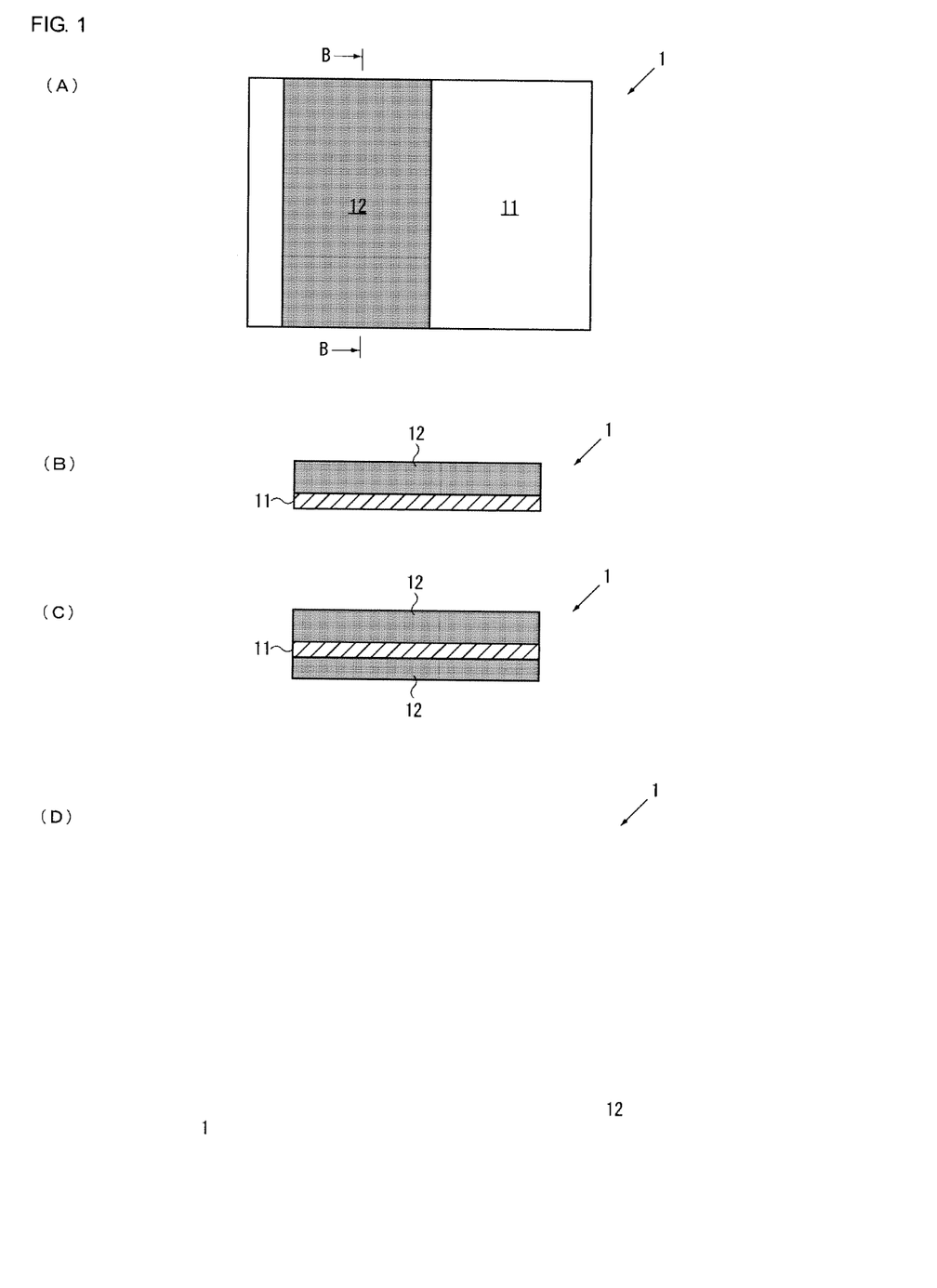
FIG. 1 shows diagrams of silicone rubber sheets according to a first embodiment of the present invention, (A) is a plan view, (B) is a sectional view along a line B-B shown in FIG. 1 (A), (C) shows a first modified example, and (D) shows a second modified example.

The embodiments of a silicone rubber sheet and an airbag device according to the present invention will be described below with reference to FIG. 1 to FIG. 7. Here, FIG. 1 shows diagrams of silicone rubber sheets according to a first embodiment of the present invention, (A) is a plan view, (B) is a sectional view along a line B-B shown in FIG. 1 (A), (C) shows a first modified example, and (D) shows a second modified example.

A silicone rubber sheet 1 according to the first embodiment of the present invention is used for a flow passage to feed gas from an inflator which generates gas by burning an agent stored in the inside to an airbag that is usually folded and is expanded and developed in the event of an emergency, and the silicone rubber sheet is produced by stacking 0.5 mm or more of silicone composition 12 containing (A) 100 parts by weight of organopolysiloxane which is represented by the following average composition formula (1):

$$R^1SiO_{(4-n)/2} \qquad (1)$$

where in the formula, $R^1$ represents a substituted or unsubstituted monovalent hydrocarbon group and n represents a positive number of 1.95 to 2.05, and which exhibits an average degree of polymerization of 1,000 or more,
(B) 20 to 80 parts by weight of reinforcing silica powder having a specific surface area of 50 $m^2/g$ or more, and
(C) a curing agent
on at least an inner surface of a fiber fabric 11 (synthetic fiber fabric or inorganic fiber fabric) constituting the flow passage and performing heat curing.

(Silicone Composition)

In the present embodiment, the silicone composition 12 constituting the silicone rubber sheet 1 for an airbag module is specifically formed from the following Component (A) to Component (C).

Component (A) is a base component of the silicone composition 12, and organopolysiloxane represented by the average composition formula (1) is used. In the formula, $R^1$ represents a substituted or unsubstituted monovalent hydrocarbon group. Specific examples of $R^1$ include alkyl groups, e.g., a methyl group, an ethyl group, and a propyl group, cycloalkyl groups, e.g., a cyclopentyl group and a cyclohexyl group, alkenyl groups, e.g., a vinyl group and an allyl group, aryl groups, e.g., a phenyl group and a tolyl group, and halogenated hydrocarbons in which hydrogen atoms of the above-described groups are partly substituted by a chlorine atom, a fluorine atom, and the like. In general, it is preferable that a main chain of the organopolysiloxane be composed of a dimethylsiloxane unit or a vinyl group, a phenyl group, a trifluoropropyl group, or the like be introduced into the main chain of the organopolysiloxane. Also, the main chain end can be terminated by a triorganosilyl group or a hydroxyl group. Specific examples of triorganosilyl groups include a trimethylsilyl group, a dimethylvinylsilyl group, and a trivinylsilyl group. A symbol n represents a positive number of 1.95 to 2.05. In this regard, the average degree of polymerization of Component (A) used for the present application is preferably 1,000 or more. If the average degree of polymerization of Component (A) is less than 1,000, the mechanical strength after curing may be poor, and sufficient durability may not be obtained with respect to a high-temperature gas from the inflator.

Meanwhile, the organopolysiloxane has preferably at least an alkenyl group bonded to two silicon atoms in one molecule and has preferably 0.001 to 5 percent by mole, in particular 0.01 to 1 percent by mole, of vinyl group in R.

Component (B) is reinforcing silica for the silicone composition 12. The organopolysiloxane serving as Component (A) has very small strength as compared with the strength of other synthetic rubbers and is not at a level of being usable by itself. Then, a filler, in particular reinforcing silica, is added to the organopolysiloxane and, thereby, the strength suitable for use can be exhibited.

The reinforcing silica is blended to obtain a silicone rubber exhibiting excellent mechanical strength, and the specific surface area by the BET method is preferably 50 $m^2/g$ or more, and in particular 100 to 400 $m^2/g$. Examples of the reinforcing silica include fumed silica (dry silica) and precipitated silica (wet silica). In particular, fumed silica (dry silica) having a small impurity content is preferable. Also, the surface of the reinforcing silica may be hydrophobized with organopolysiloxane, organosilazane, chlorosilane, alkoxysilane, or the like.

The amount of addition of this reinforcing silica is not specifically limited but is adjusted within the range of preferably 20 to 80 parts by mass because if the amount is less than 20 parts by mass relative to 100 parts by mass of organopolysiloxane serving as Component (A), sufficient reinforcing effect may not be obtained, and if the amount is more than 80 parts by mass, the formability may be degraded.

Furthermore, as necessary, various additives, e.g., a color pigment, a heat resistance improver, a flame retardancy improver, and an acid acceptor, and various types of alkoxysilane, diphenylsilane diol, carbon functional silane, silanol-containing siloxane, and the like serving as fluorine based mold release agents or reinforcing silica dispersing agents may be added.

The silicone composition 12 containing the reinforcing silica can be obtained by mixing Component (A) and Component (B) homogeneously with a kneader, e.g., a two-roll, a Banbury mixer, a kneader, or a planetary mixer, and performing a heat treatment at a temperature of 100° C. or higher, as necessary.

Component (C) is a curing agent of the silicone composition 12 and may be a previously known agent commonly used for curing a silicone rubber. Example thereof include organic peroxides, e.g., di-t-butyl peroxide, 2,5-dimethyl-2,5-di(t-butylperoxy)hexane, and dicumyl peroxide, used for a radical reaction, addition reaction curing agents composed of organohydrogenpolysiloxanes having at least two hydrogen atoms bonded to silicon atoms in one molecule and platinum group metal based catalysts in the case where the organopolysiloxane has an alkenyl group, and organosilicon compounds serving as condensation reaction curing agents and having at least two hydrolyzable groups, e.g., an alkoxy group, an acetoxy group, a ketoxime group, and a propenoxy group, in the case where the organopolysiloxane contains a silanol group. The amount of addition thereof may be the same as the amount in the common silicone rubber.

Either millable type or liquid type may be used as the silicone composition 12 containing the reinforcing silica. Preferably, the silicone composition 12 is organic peroxide-curable type or addition reaction-curable type from the viewpoint of the operability and the formability.

Meanwhile, the composition according to the present embodiment may be stacked on the fiber fabric 11 (synthetic fiber fabric or inorganic fiber fabric) constituting the base cloth of the airbag, and for the purpose of improving the adhesion at that time, an adhesion aid may be blended. Examples of the adhesion aids can include organosilicon based compounds having at least one type of, and preferably, two or more types of functional groups selected from the group consisting of an alkenyl group, e.g., a vinyl group, a (meth)acryloxy group, a hydrosilyl group, an epoxy group, an alkoxysilyl group, a carbonyl group, a phenyl group, and an amino group and non-silicon based organic compounds. Specific examples of the adhesion aids may include the following compounds.

[Chem. 1]

-continued (In formula, a portion where an element name is not described is a methyl group, a methylene group, or a methin group.)

(Silicone Rubber Sheet for Airbag Module)

As shown in FIG. 1 (A), in the silicone rubber sheet 1 for an airbag module according to the present embodiment, preferably, the silicone composition 12 is stacked directly on the fiber fabric 11, e.g., a base cloth. As shown in FIGS. 1 (B) and (C), 0.5 mm or more in total of silicone composition 12 is stacked on one surface or both surfaces of the fiber fabric 11. The fiber fabric 11 is a synthetic fiber fabric (for example, a polyamide fiber fabric, a polyester fiber fabric, an aramid fiber fabric, a polyether imide fiber fabric, or a fluororesin fiber fabric) or an inorganic fiber fabric (for example, a glass fiber fabric, a carbon fiber fabric, or a stainless steel fiber fabric). In this regard, FIG. 1 (C) is a sectional view along a line B-B, illustrating a first modified example of a silicone rubber sheet 1 according to the first embodiment.

As for the stacking method, a method in which the silicone composition 12 liquefied by being dissolved in a solvent, e.g., toluene, is applied and formed on the fiber fabric 11 by a process of a knife coating process, a comma coating process, a dip coating process, a calender coating process, or the like and solvent removal and heat curing are performed in the air on an "as is" basis is mentioned, although not limited to this. In the calender coating process, the silicone composition 12 can be directly formed on the fiber fabric 11 without using a diluent solvent. In this regard, the heat curing conditions are preferably 120° C. to 180° C. and 3 to 10 minutes, although not limited to them.

Meanwhile, as shown in FIG. 1 (A), the silicone composition 12 is not necessarily disposed all over the silicone rubber sheet 1 and may be disposed on only a portion which comes into contact with a high temperature high pressure gas easily, that is, a portion disposed at a place close to the inflator. As a matter of course, as shown in FIG. 1 (D), the silicone composition 12 may be stacked all over the fiber fabric 11. In this regard, FIG. 1 (D) is a diagram illustrating a second modified example of the silicone rubber sheet 1 according to the first embodiment, the upper section is a plan view, and the lower section is a sectional view.

Figure 2:
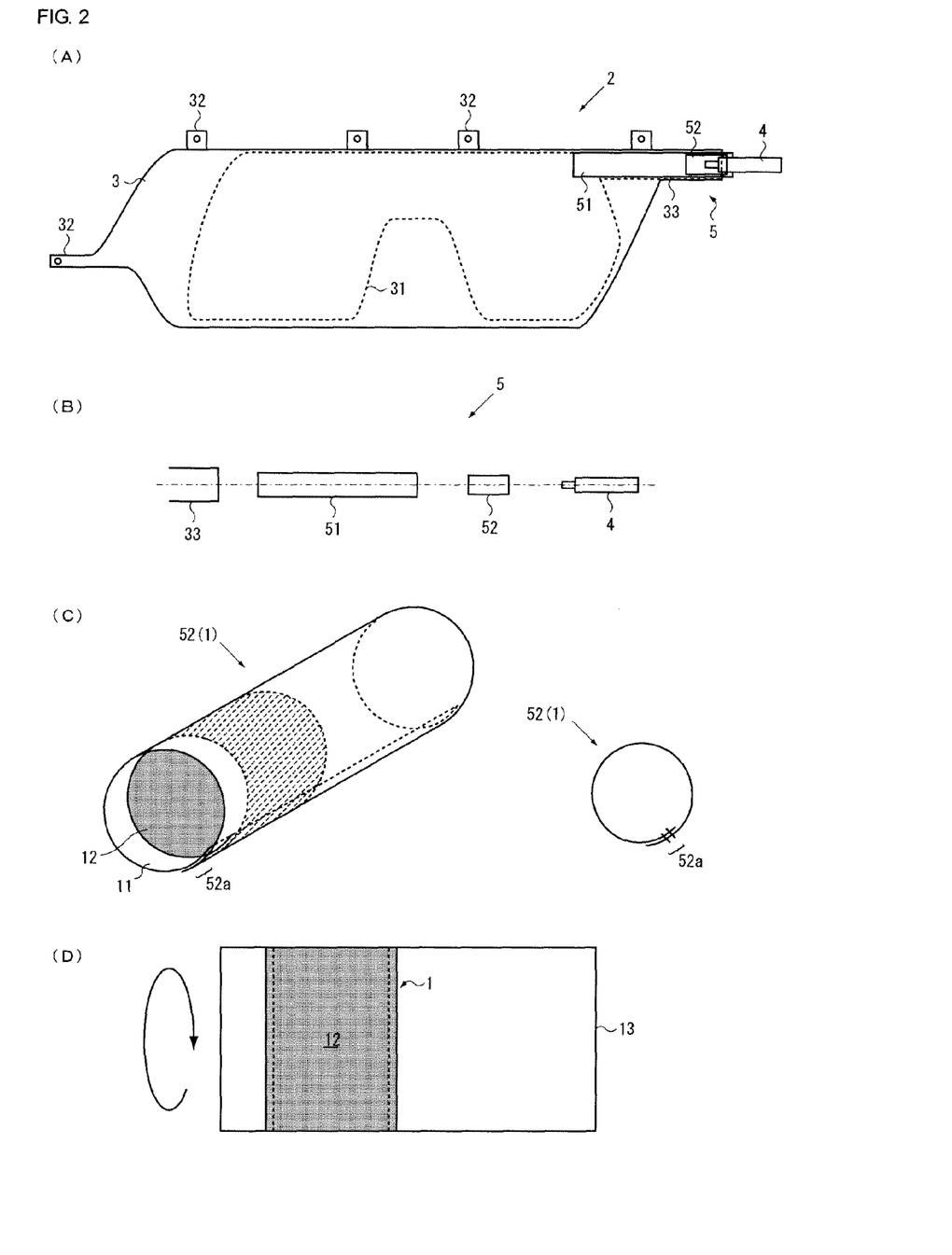
FIG. 2 shows diagrams of airbag devices according to the first embodiment of the present invention, (A) is a whole configuration diagram, (B) is a component configuration diagram around an inflator, (C) is a magnified diagram of an inner tube, and (D) is an expanded plan view of an inner tube including a silicone rubber sheet in the second modified example.

Here, an airbag device including the above-described silicone rubber sheet 1 will be described with reference to FIG. 2. FIG. 2 shows diagrams of airbag devices according to the first embodiment of the present invention, (A) is a whole configuration diagram, (B) is a component configuration diagram around an inflator tube, (C) is a magnified diagram of an inner tube, and (D) is an expanded plan view of an inner tube including a silicone rubber sheet in the second modified example.

As shown in FIG. 2 (A), an airbag device 2 according to the first embodiment of the present invention includes an airbag 3 which is usually folded and which is expanded and developed in the event of an emergency, an inflator 4, which generates gas by burning an agent stored in the inside, and a flow passage 5 to feed the gas from the inflator 4 to the airbag 3, wherein the above-described silicone rubber sheet 1 is used for at least part of the flow passage 5.

The airbag device 2 shown in the drawing is a so-called curtain airbag device, where the airbag 3 is expanded and developed over a front seat and a rear seat. For example, a bag body of the airbag 3 is formed by bonding a base cloth to constitute a front surface together with a base cloth to constitute a back surface and sewing up the outer circumferences and the airbag 3 is divided into a plurality of expansion bodies by a seam 31 sewed in such a way as to form the expansion bodies which are expanded into desired shapes. The shape of the seam 31 is not limited to the shape shown in the drawing.

Also, a plurality of tabs 32 to be connected to a car body (for example, roof side rail) are disposed on the outer circumference of the airbag 3.

The inflator 4 of so-called cylinder type explosive system is used. The inflator 4 is connected to, for example, an ECU (electronic control unit) of a vehicle and is controlled on the basis of a measurement value of an acceleration sensor or the like. When the ECU detects or predicts crash or rapid deceleration of the vehicle, the inflator 4 is ignited because of an ignition current from the ECU, an agent stored in the inside of the inflator 4 is burnt to generate gas, the gas is spouted from a spouting nozzle disposed at the end and, thereby, the gas is fed to the airbag 3.

As shown in FIG. 2 (B), the flow passage 5 includes an insertion hole 33 which is disposed in the airbag 3 and into which the inflator 4 is inserted, a diffuser 51 which is inserted through the insertion hole 33 into the inside of the airbag 3 and which distributes and guides the gas, and an inner tube 52 which is disposed in the inside of the diffuser 51 and which has the heat resistance and the pressure resistance. The end portion of the inflator 4 is inserted into the inner tube 52.

The diffuser 51 is, for example, a tubular component formed from the base cloth constituting the airbag 3, and as necessary, distribution holes and dead ends are disposed. In this regard, the diffuser 51 is not limited to have a linear shape, as shown in the drawing, and may have a curved shape or a branched end in the shape of the letter T or the shape of the letter Y, for example. The diffuser 51 is inserted into the insertion hole 33 of the airbag 3 and is fixed by sewing up or the like.

The inner tube 52 is produced by forming the silicone rubber sheet 1 into a substantially cylindrical shape and is inserted into the diffuser 51 while being disposed in such a way as to cover the end portion of the inflator 4. That is, the silicone rubber sheet 1 is formed into a cylindrical shape in such a way as to cover the spouting nozzle of the inflator 4 and is fixed to the airbag 3 or the inflator 4. For example, the inner tube 52 may be fixed by being secured to a car body mounting portion of the inflator 4, be indirectly fixed to the airbag 3 by being sewed on the diffuser 51, or be directly fixed to the airbag 3 by being sewed on the diffuser 51 and the insertion hole 33.

Meanwhile, as shown in FIG. 2 (C), the inner tube 52 is formed having a cylindrical shape by rolling the silicone rubber sheet 1 to form a duplicated portion 52a, where two end portions are overlapped in such a way that the silicone composition 12 is arranged inside, and bonding the duplicated portion 52a by sewing or sticking with an adhesive. According to such a configuration, a heat-resistant pressure-resistant structure is formed in which the silicone composition 12 is disposed on the total inner circumference of the inner tube 52. In this regard, in FIG. 2 (C), the left drawing is a perspective view and the right drawing is a sectional view. In the sectional view, the silicone composition 12 is not shown in the drawing. Meanwhile, in the case where the silicone rubber sheet 1 in which the silicone composition 12 is stacked on both surfaces of the fiber fabric 11 is used, it is preferable that the side having a large layer thickness of silicone composition 12 be arranged on the inner side of the inner tube 52.

Then, the spouting nozzle of the inflator 4 is disposed in a portion where the silicone composition 12 is stacked on the inner tube 52. The gas spouted from the inflator 4 may be spouted toward the inner periphery of the inner tube 52, although expansion and deformation of the inner tube 52 (silicone rubber sheet 1) can be suppressed because the inner tube 52 is formed from the silicone rubber sheet 1 in which the silicone composition 12 is stacked on the fiber fabric 11.

Also, the inner tube 52 can be formed by using the silicone rubber sheet 1 on which the silicone composition 12 is stacked all over one surface or all over both surfaces of the fiber fabric 11. The inner tube 52 in which the silicone composition 12 is disposed all over the inner periphery can be formed by using such a silicone rubber sheet 1 and rolling into a cylindrical shape as shown in FIG. 2 (C). Also, as shown in FIG. 2 (D), the silicone rubber sheet 1 in which the silicone composition 12 is stacked all over one surface of the fiber fabric 11 may be disposed on one surface (or both surfaces) of a shaped sheet 13 formed from a base cloth equivalent to the fiber fabric 11 in such a way that the silicone composition 12 serves as the surface and sewing may be performed. The shaped sheet 13 provided with the silicone rubber sheet 1 by sewing is rolled into a cylindrical shape, as with the case shown in FIG. 1 (C), and thereby, the inner tube 52 in which the silicone composition 12 is disposed on the total inner circumference partly can be formed.

Figure 3:
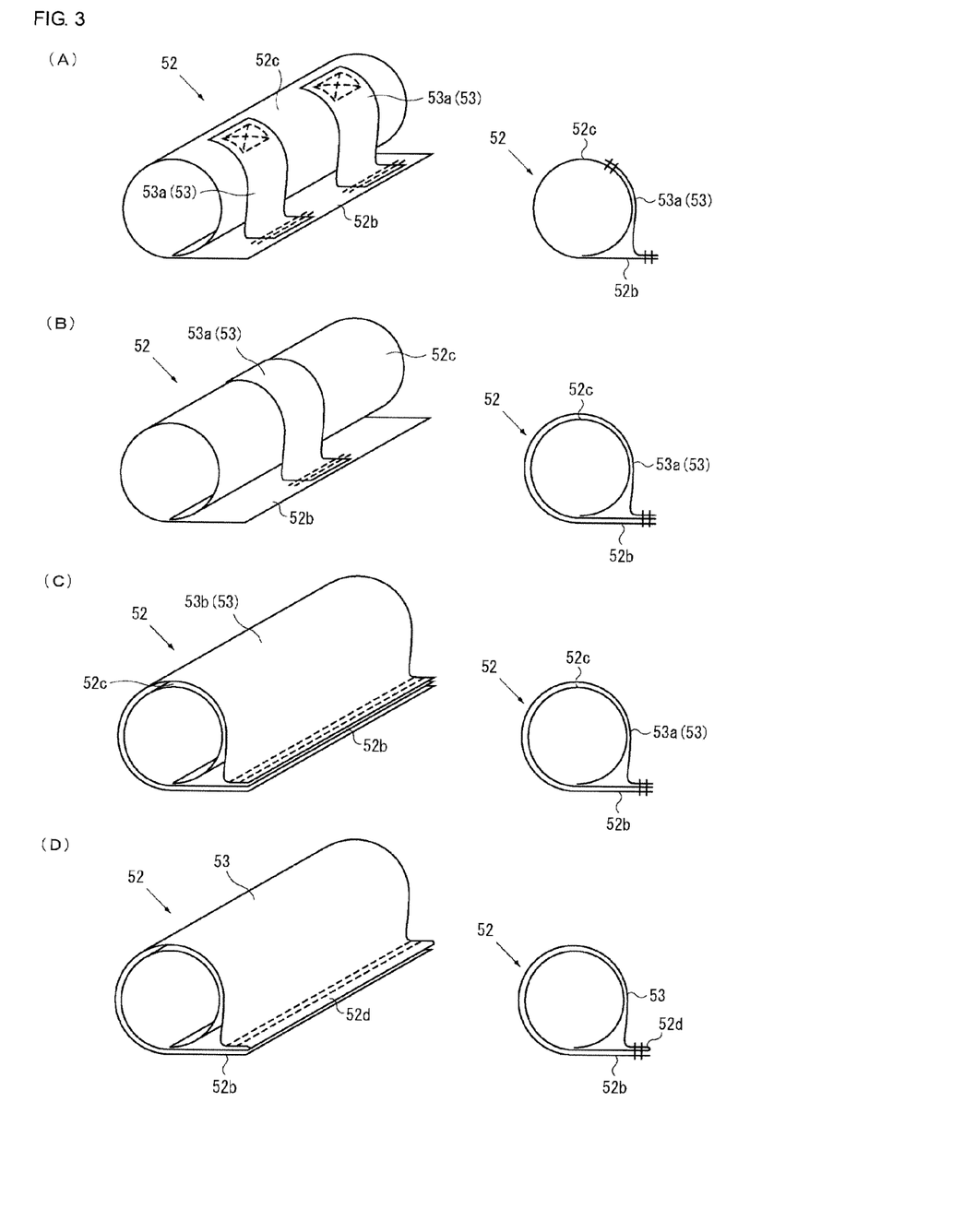
FIG. 3 shows diagrams of modified examples of the inner tubes shown in FIG. 2, (A) shows a first modified example, (B) shows a second modified example, (C) shows a third modified example, and (D) shows a fourth modified example.
Figure 4:
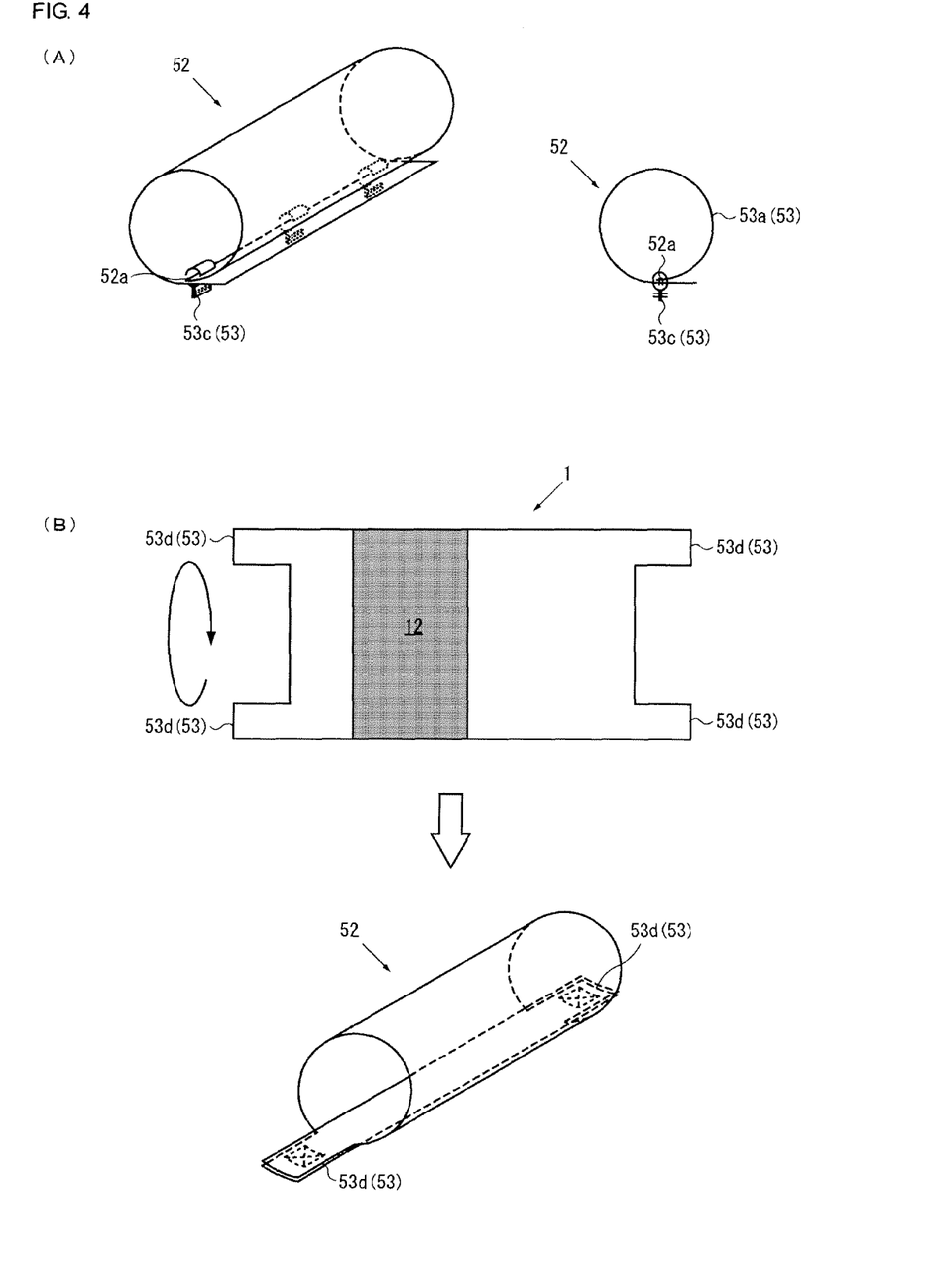
FIG. 4 shows diagrams of modified examples of the inner tubes shown in FIG. 2, (A) shows a fifth modified example and (B) shows a sixth modified example.

Next, a modified example of the above-described inner tube 52 will be described with reference to FIG. 3 and FIG. 4. Here, FIG. 3 shows diagrams of modified examples of the inner tubes shown in FIG. 2, (A) shows a first modified example, (B) shows a second modified example, (C) shows a third modified example, and (D) shows a fourth modified example. FIG. 4 shows diagrams of modified examples of the inner tubes shown in FIG. 2, (A) shows a fifth modified example and (B) shows a sixth modified example. In this regard, in each drawing, the silicone composition 12 is not shown for convenience of explanation. Also, in each drawing, the left drawing is a perspective view and the right drawing is a sectional view.

These modified examples include the inner tubes 52 in which the silicone rubber sheets 1 are formed into substantially cylindrical shapes and shape retention members 53 to retain the shapes of the inner tubes 52. Expansion and deformation of the inner tubes 52 in the case where the gas is fed from the inflators 4 can be suppressed effectively by connecting the shape retention members 53 to the inner tubes 52.

In the first modified example shown in FIG. 3 (A), the shape retention member 53 is formed from belt members 53a which connects an end portion 52b protruded from the inner tube 52 to the outer periphery 52c of the inner tube 52. The inner tube 52 is formed in such a way that one end portion of the silicone rubber sheet 1 is rolled into a cylindrical shape and the other end portion 52b is extended to the outside of the inner tube 52. Then, the shape of the inner tube 52 is retained by sewing the two end portions of the strip belt member 53a on this end portion 52b and the outer periphery 52c of the inner tube 52, respectively. The number of belt members 53a may be 1 or 3 or more.

In the second modified example shown in FIG. 3 (B), the belt member 53a is extended in such a way as to cover the outer periphery 52c of the inner tube 52 and both end portions of the belt member 53a are sewed on the end portion 52b of the inner tube 52. The shape of the inner tube 52 can be retained by this configuration as well.

In the third modified example shown in FIG. 3 (C), the shape retention member 53 is formed from a cover member 53b connected to the end portion 52b extended from the inner tube 52 in such a way as to cover the outer periphery 52c of the inner tube 52. It can be said in other words that the cover member 53b corresponds to the belt member 53a in the second modified example, where the belt member 53a is formed having a large width in such a way as to cover all over the inner tube 52. According to such a configuration, the whole surface of the outer periphery 52c of the inner tube 52 can be covered and, thereby, the whole shape of the inner tube 52 can be retained. In this regard, the cover member 53b does not necessarily cover the whole surface, and the width can be adjusted optionally within the range from the width of the belt member 53a shown in FIG. 3 (B) to the width of the cover member 53b shown in FIG. 3 (C) in such a way as to cover a necessary portion of the outer periphery 52c of the inner tube 52.

In the fourth modified example shown in FIG. 3 (D), a cylindrical portion (inner tube 52) is formed from one end side of the silicone rubber sheet 1, a folded portion 52d is formed from the other end side while the cylindrical portion (inner tube 52) is covered, and the other end (end portion 52b) and the folded portion 52d are sewed up. In this modified example, the inner tube 52 and the shape retention member 53 are formed from one silicone rubber sheet 1. According to such a configuration, there is no need to prepare components (belt member 53a and cover member 53b) separately, and the inner tube 52 exhibiting excellent shape retainability can be formed efficiently.

In the fifth modified example shown in FIG. 4 (A), the shape retention member 53 is formed from circular members 53c which is inserted through an overlap portion (duplicated portion 52a) of the inner tube 52 and is connected to the outer periphery of the inner tube. One end of the circular member 53c is inserted from the outside toward the inside through a slit provided in the inner tube 52, is inserted from the inside toward the outside through a slit provided in the inner tube 52 in such a way as to straddle the sewing portion of the duplicated portion 52a constituting the cylindrical shape of the inner tube 52, and is sewed on the other end in the outside of the inner tube 52, so that a circular shape is formed. According to such a configuration, opening of the sewing portion of the inner tube 52 due to an internal pressure can be suppressed and the shape of the inner tube 52 can be retained.

In the sixth modified example shown in FIG. 4 (B), when the silicone rubber sheet 1 is formed into a substantially cylindrical shape, tab portions 53d protruding in the forward and backward directions of the flow passage 5 are included, and the tab portions 53d are sewed on the airbag 3 (diffuser 51). In this regard, in FIG. 4 (B), the upper section is an expanded plan view of the silicone rubber sheet 1, and the lower section is a perspective view of the state in which the inner tube 52 is disposed.

In the inner tube 52 according to the above-described sixth modified example, as illustrated in the expanded plan view shown in FIG. 4 (B), a silicone rubber sheet 1 in which the silicone composition 12 is stacked on part of a fiber fabric 11 having the outline substantially in the shape of the letter H is used. The silicone rubber sheet 1 is provided with a pair of tab portions 53d at each of two end portions in the longitudinal direction. The tab portion 53d is disposed at each end portion in such a way as to protrude in the longitudinal direction, and these portions constitute the shape retention member 53. Then, the silicone rubber sheet 1 is rolled into a cylindrical shape in such a way that a pair of tab portions 53d disposed at the end portions on the same side coincide with each other, and is sewed up at the tab portions 53d, as illustrated in the perspective view shown in FIG. 3 (B).

The inner tube 52 having the above-described tab portions 53d is inserted into the component (airbag 3 or diffuser 51) covering the outer periphery of the inner tube 52 and, thereafter, is sewed up at the tab portions 53d, so that the position is determined. In this regard, the diffuser 51 is a component fixed to the airbag 3 and, therefore, can also be regarded as part of the airbag 3.

In this regard, the inner tubes 52 according to the above-described first modified example to sixth modified example are explained, where the silicone rubber sheet 1 in which the silicone composition 12 is stacked on part of one surface of the fiber fabric 11 is used. However, the silicone rubber sheet 1 in which the silicone composition 12 is stacked on all over one surface, part of both surfaces, or all over both surfaces of the fiber fabric 11 may be used in the inner tube 52, or as shown in FIG. 2 (D), the inner tube 52 in which the silicone rubber sheet 1 is sewed on the shaped sheet 13 may be used.

Figure 5:
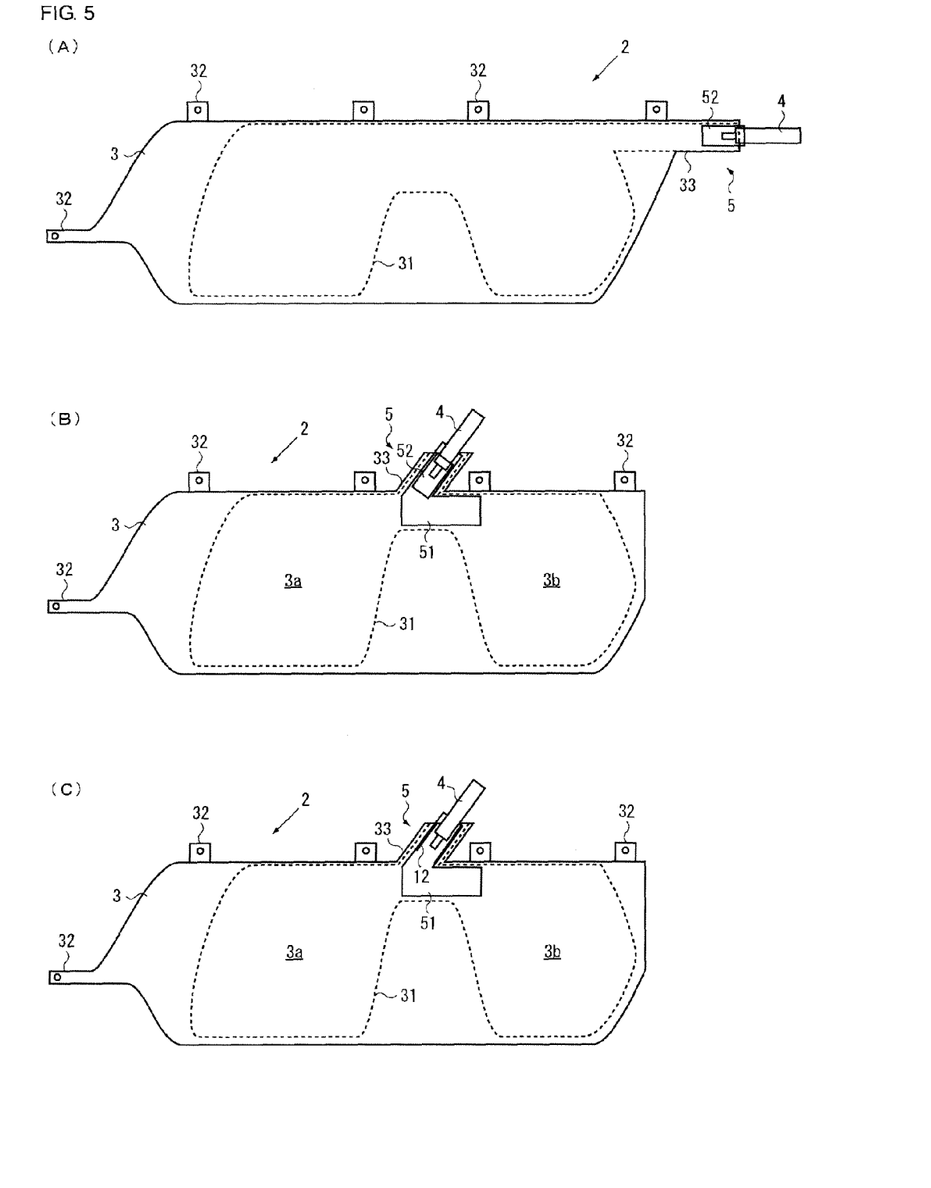
FIG. 5 shows diagrams of modified examples of the airbag devices shown in FIG. 2, (A) shows a first modified example, (B) shows a second modified example, and (C) shows a third modified example.

Next, modified examples of the above-described airbag device 2 will be described with reference to FIG. 5. Here, FIG. 5 shows diagrams of modified examples of the airbag devices shown in FIG. 2, (A) shows a first modified example, (B) shows a second modified example, and (C) shows a third modified example. In this regard, the same constituent components as those of the airbag device 2 according to the above-described first embodiment are indicated by the same reference numerals and further explanations thereof will not be provided.

In the first modified example shown in FIG. 5 (A), the diffuser 51 has been omitted from the flow passage 5. That is, the flow passage 5 is formed from the insertion hole 33 disposed in the airbag 3 and the inner tube 52 having the heat resistance and the pressure resistance. In the case where it is not necessary to consider distribution and the like of the gas fed to the airbag 3 or in the case where the gas can be distributed or guided by other components (for example, seam), the diffuser 51 may be omitted.

In the second modified example shown in FIG. 5 (B), the flow passage 5 is disposed in the substantially central portion of the airbag 3. Specifically, the insertion hole 33 is disposed in the intermediate portion between a front expansion portion 3a and a rear expansion portion 3b of the airbag 3, and the diffuser 51, the inner tube 52, and the inflator 4 are connected to this insertion hole 33. As shown in the drawing, the diffuser 51 has substantially the shape of the letter V, for example, and is configured to be able to distribute and feed the gas from opening portions disposed in the forward and backward directions to the front expansion portion 3a and the rear expansion portion 3b. In this regard, the shape of the diffuser 51 is not limited to the shape shown in the drawing, and may be the shape of the letter Y, the shape of the letter T, or the shape of the letter I having distribution holes and the like.

In the third modified example shown in FIG. 5 (C), the diffuser 51 is formed from the above-described silicone rubber sheet 1. The diffuser 51 is formed by bonding and sewing a pair of base cloths having, for example, substantially the shape of the letter V with each other. This base cloth is formed from the silicone rubber sheet 1 provided with the silicone composition 12 on a portion into which the inflator 4 is inserted. According to such a configuration, the inner tube 52 can be omitted.

Figure 6:
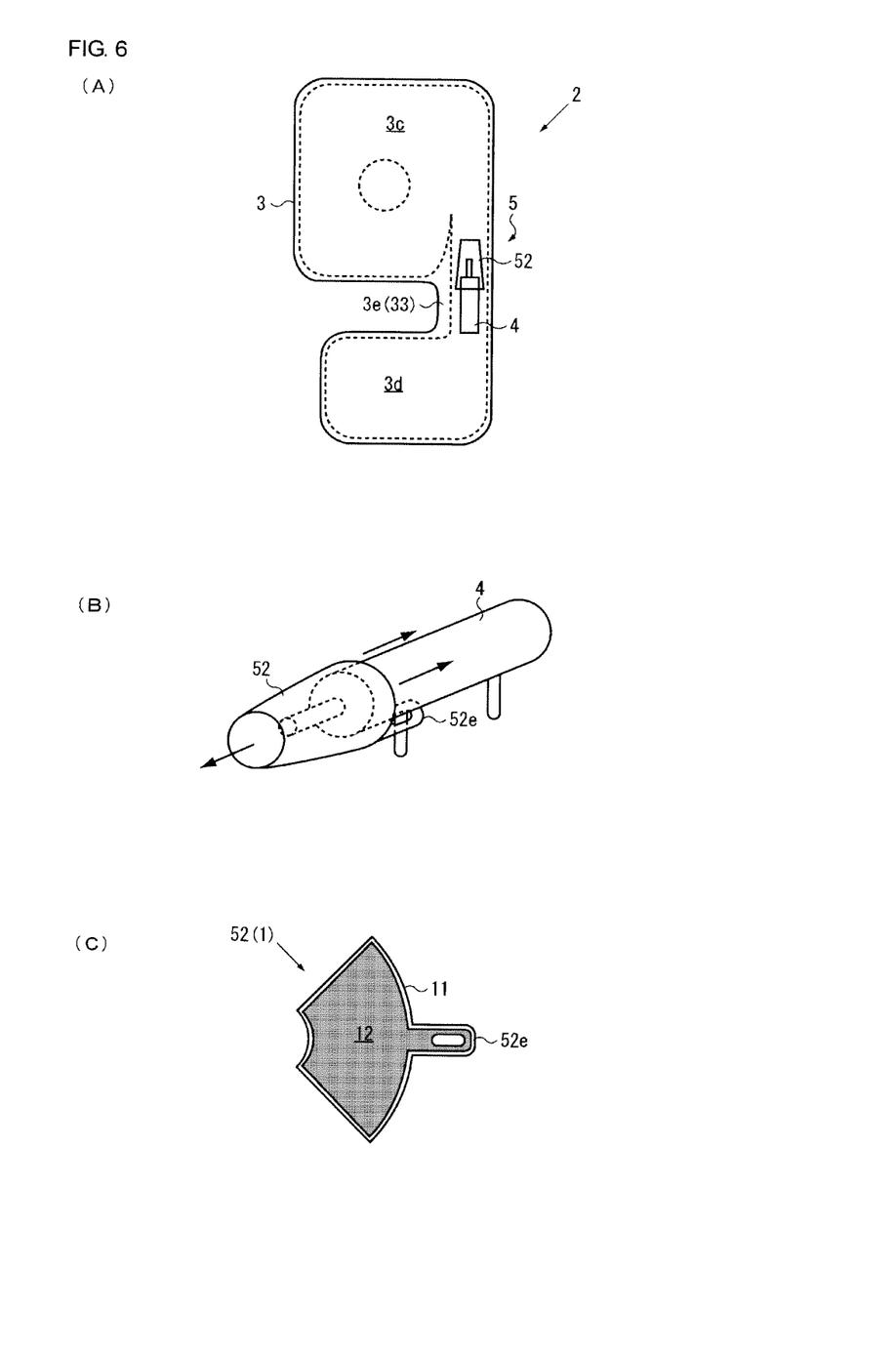
FIG. 6 shows diagrams of airbag devices according to a second embodiment of the present invention, (A) is a whole configuration diagram, (B) is a magnified diagram around an inflator, and (C) is an expanded plan view of an inner tube.
Figure 7:
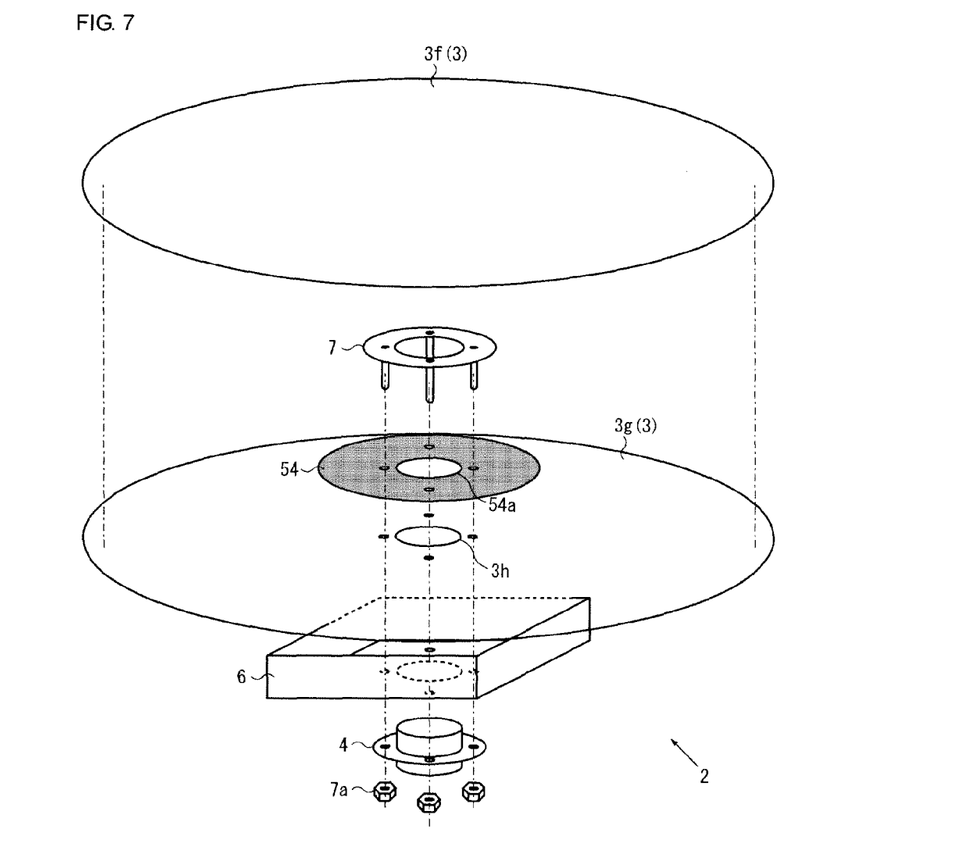
FIG. 7 is a component expanded diagram showing an airbag device according to a third embodiment of the present invention.

Then, other embodiments of the above-described airbag device 2 will be described with reference to FIG. 6 and FIG. 7. Here, FIG. 6 shows diagrams of an airbag device according to a second embodiment of the present invention, (A) is a whole configuration diagram, (B) is a magnified diagram around an inflator, and (C) is an expanded plan view of an inner tube. Meanwhile, FIG. 7 is a component expanded diagram showing an airbag device according to a third embodiment of the present invention. In this regard, the same constituent components as those of the airbag device 2 according to the above-described first embodiment are indicated by the same reference numerals and further explanations thereof will not be provided.

In the airbag device 2 according to the second embodiment shown in FIG. 6, the silicone rubber sheet 1 is used in a so-called side airbag device. For example, this airbag device 2 is disposed on both sides of a backrest portion of a vehicle seat and lessen the shock applied to side portions of the shoulders, waists, and the like of occupants by releasing the airbag 3 toward the front in the event of an emergency. As shown in FIG. 6 (A), the airbag 3 used for the side airbag device includes, for example, an upper expansion portion 3c to be expanded and developed to the shoulder portion, a lower expansion portion 3d to be expanded and developed to the waist portion, and a communication portion 3e to communicate with the upper expansion portion 3c and the lower expansion portion 3d. This communication portion 3e is a portion corresponding to the insertion hole 33 which constitutes part of the flow passage 5.

As shown in FIG. 6 (B), the inner tube 52 to distribute the spouted gas in the forward and backward directions is disposed at the end of the inflator 4 disposed in the communication portion 3e. The inner tube 52 is formed into, for example, a tubular shape constituting a conical surface (one type of cylindrical shape), and a predetermined gap is disposed between the inner surface of the inner tube 52 and the outer surface of the inflator 4. The gas is spouted in the inner tube 52, the gas is discharged from a small opening portion at the front end toward the upper expansion portion 3c and, in addition, the gas is discharged from the gap at the rear end toward the lower expansion portion 3d. As for such a distributor, a metal distributor has been used in the related art. However, miniaturization and weight reduction can be facilitated by using the silicone rubber sheet 1.

As shown in FIG. 6 (C), the inner tube 52 is formed from, for example, a silicone rubber sheet 1 in which the silicone composition 12 is stacked on a substantially fan-shape fiber fabric 11. Also, a connection portion 52e having an opening portion (long hole) capable of being secured to a car body mounting portion of the inflator 4 may be disposed in an outer edge portion of the silicone rubber sheet 1. As described above, the shape of the silicone rubber sheet 1 can be variously changed depending on the shape of the inner tube 52.

In the airbag device 2 according to the third embodiment shown in FIG. 7, the silicone rubber sheet 1 is used in a so-called driver airbag device. This airbag device 2 is disposed in, for example, a central portion of a steering and lessens a shock applied to an occupant who is moved forward because of a force of inertia by releasing an airbag 3 forward in the event of an emergency. As shown in FIG. 7, the airbag 3 used for the driver airbag device is formed by, for example, bonding and sewing a pair of base cloths (surface side base close 3f and back side base cloth 3g) having a substantially circular shape. An opening portion 3h for insertion of an inflator 4 is disposed in a substantially central portion of the back side base cloth 3g.

The inflator 4 of disc type explosive system is used, where a circular columnar main body portion has a flange portion with an enlarged diameter. A portion having a spouting nozzle of the main body portion is inserted into an opening portion of a retainer 6 storing the airbag 3 and the opening portion 3h of the back side base cloth 3g, a bag ring 7 disposed inside the airbag 3 is connected to the flange portion with fixtures 7a, e.g., nuts, and thereby, the inflator 4 is fixed to the retainer 6.

In the above-described airbag device 2, the gas spouted from the inflator 4 diffuses along the periphery of the opening portion 3h of the back side base cloth 3g into the airbag 3 and, therefore, the periphery of the opening portion 3h of the back side base cloth 3g has a function as a flow passage 5. The periphery of this opening portion 3h of the back side base cloth 3g is exposed to a high-temperature high-pressure gas and, therefore, is reinforced by stacking a plurality of base cloths (for example, 5 to 6 sheets) in the related art. However, such a reinforcing method in the related art has a problem that the reinforced portion becomes thick. Then, the above-described silicone rubber sheet 1 can be used as a reinforcing member 54 around the opening portion 3h of the back side base cloth 3g. The reinforcing member 54 formed from the silicone rubber sheet 1 has, for example, a substantially circular shape configured to have a size which covers the periphery of the opening portion 3h and is provided with an opening portion 54a, through which the inflator 4 is inserted, in the central portion.

The reinforcing member 54 is stacked in the order of the retainer 6, the back side base cloth 3g, and the reinforcing member 54 and is fixed to the retainer 6 with the bag ring 7. At this time, the reinforcing member 54 is disposed in such a way that the side on which the silicone composition 12 is stacked is arranged on the inner side of the airbag 3. As described above, the silicone rubber sheet 1 is disposed between the airbag 3 and the inflator 4 in such a way as to constitute at least part of the flow passage 5 and, thereby, the gas spouted from the inflator 4 is not blown directly on the back side base cloth 3g, the bag ring 7 which becomes at a high temperature easily does not come into direct contact with the back side base cloth 3g, and breakage of the airbag 3 (back side base cloth 3g) during use of the inflator 4 can be suppressed.

In this regard, in the airbag devices 2 according to the above-described first embodiment to third embodiment, the cases of the curtain airbag device, the side airbag device, and the driver airbag device are described. However, the present invention is not limited to these embodiments and can be applied to other types of airbag device, e.g., passenger airbag devices and knee airbag devices.

EXAMPLE 1

The silicone rubber sheet 1 according to the present invention will be specifically described below with reference to examples and comparative examples, although the present invention is not limited to the following examples.

(Composition of Silicone Composition)

A base compound was obtained by kneading 100 parts by mass of methylvinylpolysiloxane containing 99.825 percent by mole of dimethylsiloxane unit, 0.15 percent by mole of methylvinylsiloxane unit, and 0.025 percent by mole of dimethylvinylsiloxane unit and having an average degree of polymerization of 8,000, 30 parts by mass of silica fine powder having a specific surface area of 200 $m^2/g$: Aerosil 200 (registered trademark, produced by NIPPON AEROSIL CO., LTD.), 3 parts by mass of diphenylsilane diol, and 4 parts by mass of silanol-terminated dimethylpolysiloxane (degree of polymerization n=10) homogeneously and performing a heat treatment at 150° C. for 2 hours.

A silicone composition (P) was obtained by adding 2 parts by mass of cerium oxide powder having a specific surface area of 140 $m^2/g$, 30 ppm of chloroplatinic acid in terms of mass of platinum relative to the total amount of methylvinylpolysiloxane in the compound, 0.1 parts by mass of ethinylcyclohexanol serving as a reaction inhibitor relative to 100 parts by mass of methylvinylpolysiloxane, 2 parts by mass of methylhydrogenpolysiloxane represented by the following formula (Chem. 2), and 1 part of 3-glycidoxypropyltrimethoxysilane to 100 parts by mass of the above-described base compound sequentially while mixing was performed.

[Chem. 2]

In addition, a silicon composition (Q) in which the amount of addition of silica fine powder to the silicone composition (P) was specified to be 20 parts by weight and a silicone composition (R) in which the amount of addition of silica fine powder to the silicone composition (P) was specified to be 10 parts by weight were produced as samples for comparisons.

These silicone composition (P) to silicone composition (R) were stacked continuously on a nylon 66 fiber fabric (420 denier, cloth thickness 0.3 mm) for an airbag with a calendering machine, and were passed through a furnace at 160° C. for 5 minutes, so as to be cross-linked and cured.

(Test Details)

As shown in Table 1, sheets having different silicone layer thicknesses and coating surfaces (one surface and both surfaces) were formed and airbag inflation durability test described below was performed.

The silicone rubber sheet was wrapped into the shape of a circular column in such a way as to cover the ejection hole of the inflator, hot air at a temperature of 170° C. to 180° C. and a pressure of 1 MPa was hit against the sheet surface instantaneously, and the state of the sheet surface after the test was observed visually. In the case where there was almost no damage on the degree of discoloration basis, the evaluation was A, in the case where considerable discoloration of the silicone surface was observed but breakage or peeling was not observed, the evaluation was B, and in the case where the surface of the silicone layer was cut or peeling from the fiber fabric was observed, the evaluation was C.

TABLE 1

|  |  | Silicone composition | Cloth thickness [mm] | Silicone first layer [mm] | Silicone second layer [mm] | Inflation test result |
|---|---|---|---|---|---|---|
| Example | 1 | (P) | 0.3 | 0.5 | 0 | A |
|  | 2 | (P) | 0.3 | 0.7 | 0 | A |
|  | 3 | (P) | 0.3 | 0.5 | 0.3 | A |
|  | 4 | (P) | 0.3 | 0.5 | 0.6 | A |
|  | 5 | (Q) | 0.3 | 0.5 | 0 | B |
|  | 6 | (Q) | 0.3 | 0.5 | 0.3 | B |
| Comparative example | 1 | (P) | none | 0.5 | 0 | C |
|  | 2 | (P) | 0.3 | 0.3 | 0 | C |
|  | 3 | (Q) | 0.3 | 0.3 | 0 | C |
|  | 4 | (R) | 0.3 | 0.3 | 0 | C |
|  | 5 | (R) | 0.3 | 0.5 | 0 | C |

As a matter of course, the present invention is not limited to the above-described examples and embodiments and various modifications can be made within the bounds of not departing from the gist of the present invention.

The invention claimed is:

1. An airbag device comprising an airbag which is usually folded and which is expanded and developed in the event of an emergency, an inflator which generates gas by burning an agent stored in the inside, and a flow passage to feed the gas from the inflator to the airbag,
with a silicone rubber sheet being used on at least an inner surface of a synthetic fiber fabric or an inorganic fiber fabric constituting the flow passage, the silicone rubber sheet being produced by stacking 0.5 mm or more of silicone composition containing
(A) 100 parts by weight of organopolysiloxane which is represented by the following average composition formula (1):

$$R1SiO(4-n)/2 \qquad (1)$$

where in the formula, R1 represents a substituted or unsubstituted monovalent hydrocarbon group and n represents a positive number of 1.95 to 2.05,
and which exhibits an average degree of polymerization of 1,000 or more,
(B) 20 to 80 parts by weight of reinforcing silica powder having a specific surface area of 50 $m^2$/g or more and
(C) a curing agent, and,
performing heat curing; and,
wherein when the silicone rubber sheet is formed into a substantially cylindrical shape, tab portions protruding in the forward and backward directions of the flow passage are included, and the tab portions are sewed on the airbag.

2. The airbag device according to claim 1, further comprising an inner tube in which the silicone rubber sheet is formed into a substantially cylindrical shape and a shape retention member to retain the shape of the inner tube.

3. The airbag device according to claim 2, wherein the shape retention member is a belt member which connects an end portion extended from the inner tube to the outer periphery of the inner tube, a cover member connected to an end portion extended from the inner tube in such a way as to cover the outer periphery of the inner tube, or a circular member which is inserted through an overlap portion of the inner tube and is connected to the outer periphery of the inner tube.

4. The airbag device according to claim 1, wherein the cylindrical portion is formed from one end side of the silicone rubber sheet or the shaped sheet produced by sewing up of the silicone rubber sheet, the folded portion is formed from the other end side so as to cover the cylindrical portion, and the other end and the folded portion are sewed up.

* * * * *